Figure 1:
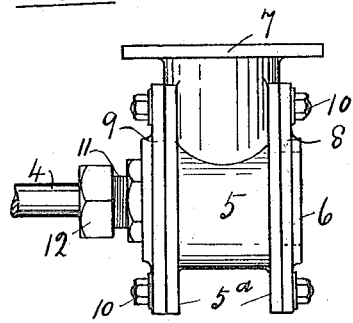

C. F. KITE & M. H. SKELT.
ROTARY PUMP AND FAN FOR WATER AND AIR AND OTHER FLUIDS.
APPLICATION FILED DEC. 13, 1915.

1,231,381. Patented June 26, 1917.

Witnesses.
Owen Giles
Frederick George Page

Inventors.
Charles Foster Kite
Matthew Henry Skelt

UNITED STATES PATENT OFFICE.

CHARLES FOSTER KITE AND MATTHEW HENRY SKELT, OF LONDON, ENGLAND.

ROTARY PUMP AND FAN FOR WATER AND AIR AND OTHER FLUIDS.

1,231,381.  Specification of Letters Patent.  Patented June 26, 1917.

Application filed December 13, 1915. Serial No. 66,546.

*To all whom it may concern:*

Be it known that we, CHARLES FOSTER KITE and MATTHEW HENRY SKELT, residing at London, England, have invented a certain new and useful Rotary Pump and Fan for Water and Air and other Fluids, of which the following is a specification.

Our invention relates to rotary pumps and circulators for liquids and is also applicable to rotary fans and blowers for air and gases, and particularly refers to improvements in the design of the impellers whereby a considerable increase in efficiency, combined with great compactness in construction is attained in such machines. A further object of our invention is to afford a free passage through such impeller and its housing, which is equal to the full cross-sectional area of the service pipes connected thereto, so that liquids and fluids can circulate through same unhindered when the impeller is out of operation.

Our improved impeller is of the drum type in which fluid enters axially and is applicable generally as a rotary pump and fan, and likewise as a circulator for heating and chilling installations and similar circulating systems, operated either by hot or cold water or other liquids or by elastic fluids.

According to this invention such improved impeller comprises a plurality of inclined vanes disposed cylindrically on a perforated disk, spider or like support, so as to form a drum the perimeter of which consists of a series of inclined planes, of relatively small radial depth, which dip in the direction of rotation, and form corresponding outlet apertures between the adjacent edges of each pair of vanes. Such vanes are all made of equal size, and have a total area which is equal to that of the corresponding cylinder or polygon of the same diameter, while the same are disposed circumferentially of the supporting disk, spider or the like and are inclined inward from its periphery, so that the lower edge of each vane is radially in line with the peripheral edge of the vane next in advance, thus forming the outlet apertures between each pair of vanes. The inclined peripheral arrangement of the impeller vanes causes the whole area of same to approximate to that of the tip or peripheral speed of the impeller, then running, thus attaining a high maximum efficiency, while the coincidence between the direction of dip of the vanes and their direction of rotation enables same to cut easily through, and to engage and urge the entering fluid through the machine, under a steady pressure without violent impact with, or useless whirling of the same so that the considerable power losses arising from these causes are eliminated.

The pressure developed by means of our improved impeller is proportional to its peripheral speed, and the same may be made of any suitable dimensions according to the pressure and volume required. Thus to give maximum volume at any required pressure, the axial length of the inclined vanes is made equal to the diameter of the circle described by their inner edges, while the number and radial depth or pitch of such vanes relatively to such diameter, should be such that the sum of the cross-sectional areas of the outlet apertures between the vanes, is equal to the area of the said circle. To increase the pressure relatively to the volume, the diameter of the impeller is increased relatively to its axial length, the number of vanes employed thereon being inversely as their required radial depth of pitch.

The impeller is housed in a compact cylindrical casing which is provided with an axial intake, and an outlet which may be disposed radially of, or at any required angle to the casing, while the impeller is arranged therein with its inlet end adjacent to the axial intake, so that the fluid can flow unhindered through such casing and impeller, when the latter is stationary.

Our invention is more particularly described with reference to the accompanying drawings, wherein similar reference numerals indicate like parts.

Figure 2:
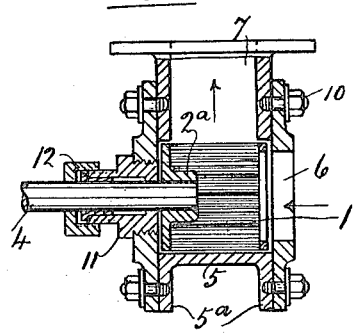
Figure 3:
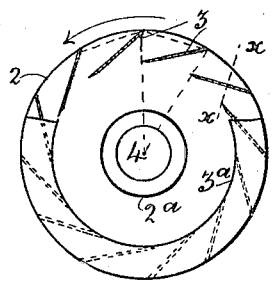
Figure 5:
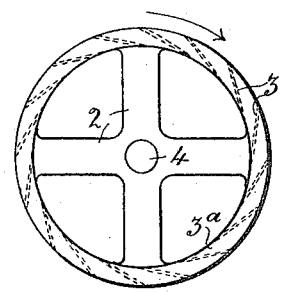
Figure 6:
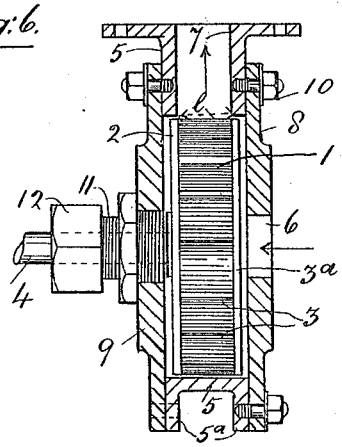

Fig. 1, is an external view, and Fig. 2, a longitudinal sectional view illustrating one construction of rotary pump formed with our improved impeller: Fig. 3, is an end view partly in section, and Fig. 4, a side view of an impeller made in accordance with our invention. Figs. 5 and 6 illustrate one of our improved impellers made of large diameter relatively to its axial length: Fig. 5, is an end view of the impeller and Fig. 6, a sectional view showing the same mounted in a suitable casing.

1, is the impeller which comprises a perforated disk, spider or the like circular support 2, which is furnished with a central boss 2ª, and carries a plurality of inclined vanes 3, cast or otherwise secured thereon, and disposed cylindrically which vanes are stiffened at their outer ends by a ring 3ª, which forms the inlet of the impeller. The vanes 3, are all of the same size, and their total area is equal to that of the corresponding closed cylinder or polygon of equal diameter to the impeller, so that such vanes arranged peripherally of the support 2, would form the corresponding closed polygon of equal diameter as indicated by dotted lines in Fig. 3. The apertures between the vanes 3, are obtained by inclining such vanes inward from the periphery so that their inner edges meet the corresponding radii on the inner circumference of the ring 3ª, as indicated in Fig. 3, so that the vanes 3, form a series of inclined planes of small radial depth which depth corresponds to that of the ring 3ª, as seen in Figs. 3 and 5, while the minimum number of vanes is determined by the required depth of such ring 3ª, and is inversely proportional thereto.

The impeller is mounted on a driving shaft 4, by means of its boss 2ª, as shown at Fig. 3, and is housed in a cylindrical casing 5, which is provided with an axial intake 6, and an outlet 7, disposed radially as shown at Figs. 2 and 6, or at any other angle required, the impeller being arranged in such casing with its inlet end adjacent to the axial intake as illustrated in Figs. 2 and 6.

For the purposes of a rotary pump such housing forms an elbow or angular junction-piece, adapted for connection to service pipes. In the constructions illustrated in Figs. 1, 2, and 6, the casing 5, is provided with flanges 5ª, to which flanged covers 8 and 9, are secured by studs and nuts 10, the axial intake 6, being contained by the cover 8, while a stuffing-box 11, carrying a gland 12, is screwed or otherwise secured in an aperture in the cover 9, see Figs. 2 and 6, the covers 8 and 9 being made interchangeable so that the inlet 6, may be arranged either on the right or the left of the casing 5, as required. The driving-shaft 4, passes through the stuffing-box 11, and is journaled in any suitable bearing and is connected in any convenient manner with an electric motor, or other suitable source of power, not indicated in the drawings. The casing 5, is made of sufficient capacity to allow for the displacement of the impeller mounted therein, so that the flow of the fluid can proceed unhindered through such casing and impeller when the latter is stationary.

The impeller 1, is rotated in the direction indicated by the curved arrows in Figs. 3 and 5, so that the direction of rotation is coincident with that in which the inclined vanes 3 dip, while the direction of flow of the fluid is indicated by the straight arrows in Figs. 2 and 6. The fluid thus enters the impeller axially through the ring 3ª, and is rapidly engaged and lifted without violent impact or whirling, by the inclined vanes 3, and delivered through the radial outlet apertures between such vanes, to the outlet 7, with a steady pressure which is proportional to the speed of the impeller.

Figure 4:
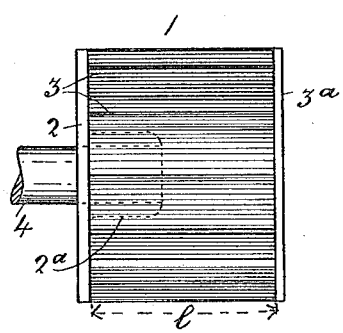

The construction of impeller illustrated at Figs. 3 and 4, is suitable for giving maximum volume at any required pressure. As shown the axial length $l$, Fig. 4, of the vanes, is about equal to the diameter of the inlet formed by the ring 3ª, while the pitch of such vanes is adjusted so that the sum of the cross-sectional areas of the apertures between the vanes, taken on the line $x$—$x$, is about equal to or rather greater than the area of the inlet ring 3ª. Figs. 1 and 2, illustrate the application of an impeller of this type to a circulator for accelerating the circulation of liquid in a heating or chilling installation. The construction of impeller illustrated at Figs. 5 and 6 is suitable for developing high pressure relative to the volume of fluid delivered, for which purpose the diameter of the impeller is made large relatively to its axial length.

Fig. 6 illustrates an impeller of this type mounted in a suitable casing to form a high pressure pump, the intake 6 of which may be furnished with a foot-valve if desired.

We claim:

1. An impeller for rotary fans and pumps having an axial intake, comprising a perforated circular support adapted for mounting on a driving shaft, and a plurality of inclined vanes of equal size disposed cylindrically on said support, with the adjacent edges of each pair of vanes radially in line so that said vanes dip in the direction of rotation of the impeller, and form outlet apertures between the adjacent edges of each pair of said vanes.

2. An impeller of the drum type for rotary pumps and fans comprising a plurality of inclined vanes of equal size, the total area of which is equal to that of the corresponding drum of the same diameter, said vanes being disposed cylindrically on a perforated support, and inclined inward from its periphery so as to form a series of inclined planes of small radial depth that dip in the direction of rotation of the impeller, with oblique apertures of corresponding depth between their adjacent edges, the number of said vanes and radial apertures being inversely as their required radial depth.

3. An impeller of the drum type for rotary pumps and fans comprising a plurality of inclined vanes of equal size, the total area of which is equal to that of the corresponding drum of the same diameter, which vanes are disposed cylindrically on a perforated support which is furnished with a central support or hub, a stiffening ring connected to the outer ends of said vanes and forming the axial inlet of the impeller, which vanes are inclined inward from the periphery to the inner circumference of said ring with their adjacent ends radially in line thereon, so as to dip in the direction of rotation of said impeller and form corresponding outlet apertures between said vanes.

4. In a rotary pump or fan the combination of an inclosing casing provided with an axial intake and a peripheral outlet, and a rotary impeller comprising a plurality of inclined vanes of equal size disposed cylindrically on a circular support mounted on a driving shaft, a stiffening ring connected to the outer ends of said vanes and forming the axial inlet of said impeller, which vanes are inclined inward from the periphery to the inner circumference of said ring with their adjacent ends in radial line thereon so that they dip in the direction of rotation of the impeller and form a series of inclined planes with outlet apertures of corresponding radial depth between their adjacent edges.

5. In a rotary pump or fan the combination of a cylindrical casing provided with an axial intake and a peripheral outlet, and a rotary impeller comprising a plurality of inclined vanes of equal size and having a total area equal to that of the corresponding drum said vanes being disposed cylindrically on a circular support mounted on a driving shaft, a stiffening ring connected to the outer ends of said vanes and forming the axial inlet of said impeller, which vanes are inclined inward from the periphery to the inner circumference of said ring, with their adjacent ends in radial line thereon, so as to form a series of inclined planes which dip in the direction of rotation of the impeller and form outlet apertures of corresponding radial depth between their adjacent edges, said cylindrical casing having a pair of interchangeable flanged covers one whereof forms said axial intake, while the other carries a bearing for said impeller driving shaft so that said axial intake can be arranged either on the right or the left of said casing.

CHARLES FOSTER KITE.
MATTHEW HENRY SKELT.

Copies of this patent may be obtained for five cents each, by addressing the "Commissioner of Patents, Washington, D. C."